(12) United States Patent
Ishimitsu

(10) Patent No.: US 10,190,510 B2
(45) Date of Patent: Jan. 29, 2019

(54) FUEL STORAGE APPARATUS

(71) Applicant: HONDA MOTOR CO., LTD., Tokyo (JP)

(72) Inventor: Kengo Ishimitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 15/229,121

(22) Filed: Aug. 5, 2016

(65) Prior Publication Data
US 2017/0058791 A1    Mar. 2, 2017

(30) Foreign Application Priority Data
Aug. 28, 2015 (JP) ................... 2015-168649

(51) Int. Cl.
| | |
|---|---|
| *F02D 19/06* | (2006.01) |
| *F02M 37/00* | (2006.01) |
| *B01D 61/36* | (2006.01) |
| *F02M 31/16* | (2006.01) |
| *F02M 31/20* | (2006.01) |

(52) U.S. Cl.
CPC ....... *F02D 19/0649* (2013.01); *B01D 61/362* (2013.01); *F02D 19/0671* (2013.01); *F02M 31/16* (2013.01); *F02M 31/20* (2013.01); *F02M 37/0064* (2013.01); *F02M 37/0082* (2013.01); *F02M 37/0088* (2013.01); *Y02T 10/126* (2013.01); *Y02T 10/36* (2013.01)

(58) Field of Classification Search
CPC ............. F02D 19/0649; F02D 19/0671; B01D 61/362; F02M 31/16; F02M 31/20; F02M 37/0064; F02M 37/0082; F02M 37/0088; Y02T 10/126; Y02T 10/36

USPC ........................................................ 123/1 A
See application file for complete search history.

(56) References Cited

U.S. PATENT DOCUMENTS

| | | | | |
|---|---|---|---|---|
| 4,237,850 A | * | 12/1980 | Connor .................. | F02M 31/16 123/557 |
| 4,726,346 A | * | 2/1988 | Lucht ..................... | F02M 31/10 123/142.5 R |
| 5,140,966 A | * | 8/1992 | Wong ..................... | F02M 17/20 123/543 |
| 5,662,090 A | * | 9/1997 | Ward .................... | F02M 31/107 123/557 |
| 6,957,542 B1 | * | 10/2005 | Kido ..................... | F02M 25/089 123/519 |

(Continued)

FOREIGN PATENT DOCUMENTS

JP    2011-208541    10/2011

*Primary Examiner* — Joseph Dallo
*Assistant Examiner* — Yi-Kai Wang
(74) *Attorney, Agent, or Firm* — Mori & Ward, LLP

(57) ABSTRACT

A fuel storage apparatus includes a fuel tank, a heat exchanger, a fuel pipe, and a medium pipe. The heat exchanger performs heat exchange between fuel inside the fuel tank and a heat exchange medium. The fuel pipe is provided inside the fuel tank and delivers the fuel to the heat exchanger. The medium pipe is provided outside the fuel tank and delivers the heat exchange medium to the heat exchanger. The heat exchanger includes a first joint and a second joint. The first joint is provided inside the fuel tank and is connectable to the fuel pipe. The second joint is provided outside the fuel tank and is connectable to the medium pipe.

22 Claims, 3 Drawing Sheets

(56) References Cited

U.S. PATENT DOCUMENTS

| | | | | |
|---|---|---|---|---|
| 2008/0296288 A1* | 12/2008 | Girondi | ............ | B01D 35/18 |
| | | | | 219/552 |
| 2009/0235908 A1* | 9/2009 | Kubo | ............ | F02M 37/0064 |
| | | | | 123/575 |
| 2014/0041642 A1* | 2/2014 | Tsutsumi | ............ | F02M 31/00 |
| | | | | 123/541 |
| 2016/0369700 A1* | 12/2016 | Ribarov | ............ | B64D 41/00 |

* cited by examiner

FUEL STORAGE APPARATUS

CROSS REFERENCE TO RELATED APPLICATIONS

The present application claims priority under 35 U.S.C. § 119 to Japanese Patent Application No. 2015-168649, filed Aug. 28, 2015, entitled "Fuel Storage Apparatus." The contents of this application are incorporated herein by reference in their entirety.

BACKGROUND

1. Field

The present disclosure relates to a fuel storage apparatus.

2. Description of the Related Art

There has been known a fuel storage system in which a separation device is used to separate ethanol-blended gasoline or other raw fuel containing components of different octane numbers into a high-octane fuel containing more components of high octane numbers than the raw fuel and a low-octane fuel containing more components of low octane numbers than the raw fuel and in which the high-octane fuel and the low-octane fuel are selectively supplied to an internal combustion engine (see, for example, Japanese Unexamined Patent Application Publication No. 2011-208541). Such a fuel storage system includes a raw fuel tank that stores the raw fuel, a separation device that separates the raw fuel into the high-octane fuel and the low-octane fuel, and a high-octane fuel tank that stores the high-octane fuel. The separation device includes a heat exchanger (or heater) that heats the raw fuel, a separator that uses a separation membrane to separate the heated raw fuel into the high-octane fuel and the low-octane fuel in accordance with the principle of pervaporation, and a cooler that cools the fuels resulting from the separation process. When the internal combustion engine runs, for example, at a high compression ratio, the fuel storage system can prevent knocking of the engine by increasing the ratio of the high-octane fuel to be supplied to the engine.

SUMMARY

According to one aspect of the present invention, a fuel storage apparatus includes a fuel tank, a heat exchanger, a fuel pipe, and a medium pipe. The heat exchanger performs heat exchange between fuel inside the fuel tank and a heat exchange medium. The fuel pipe is provided inside the fuel tank and delivers the fuel to the heat exchanger. The medium pipe is provided outside the fuel tank and delivers the heat exchange medium to the heat exchanger. The heat exchanger includes a first joint and a second joint. The first joint is provided inside the fuel tank and is connectable to the fuel pipe. The second joint is provided outside the fuel tank and is connectable to the medium pipe.

According to another aspect of the present invention, a fuel storage apparatus includes a fuel tank, a heat exchanger, a fuel pipe, and a medium pipe. The heat exchanger is mounted to the fuel tank to perform heat exchange between fuel provided inside the fuel tank and a heat exchange medium. The fuel pipe is provided inside the fuel tank and is connected to the heat exchanger to supply the fuel to the heat exchanger via the fuel pipe. The medium pipe is provided outside the fuel tank and is connected to the heat exchanger to supply the heat exchange medium to the heat exchanger via the medium pipe.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
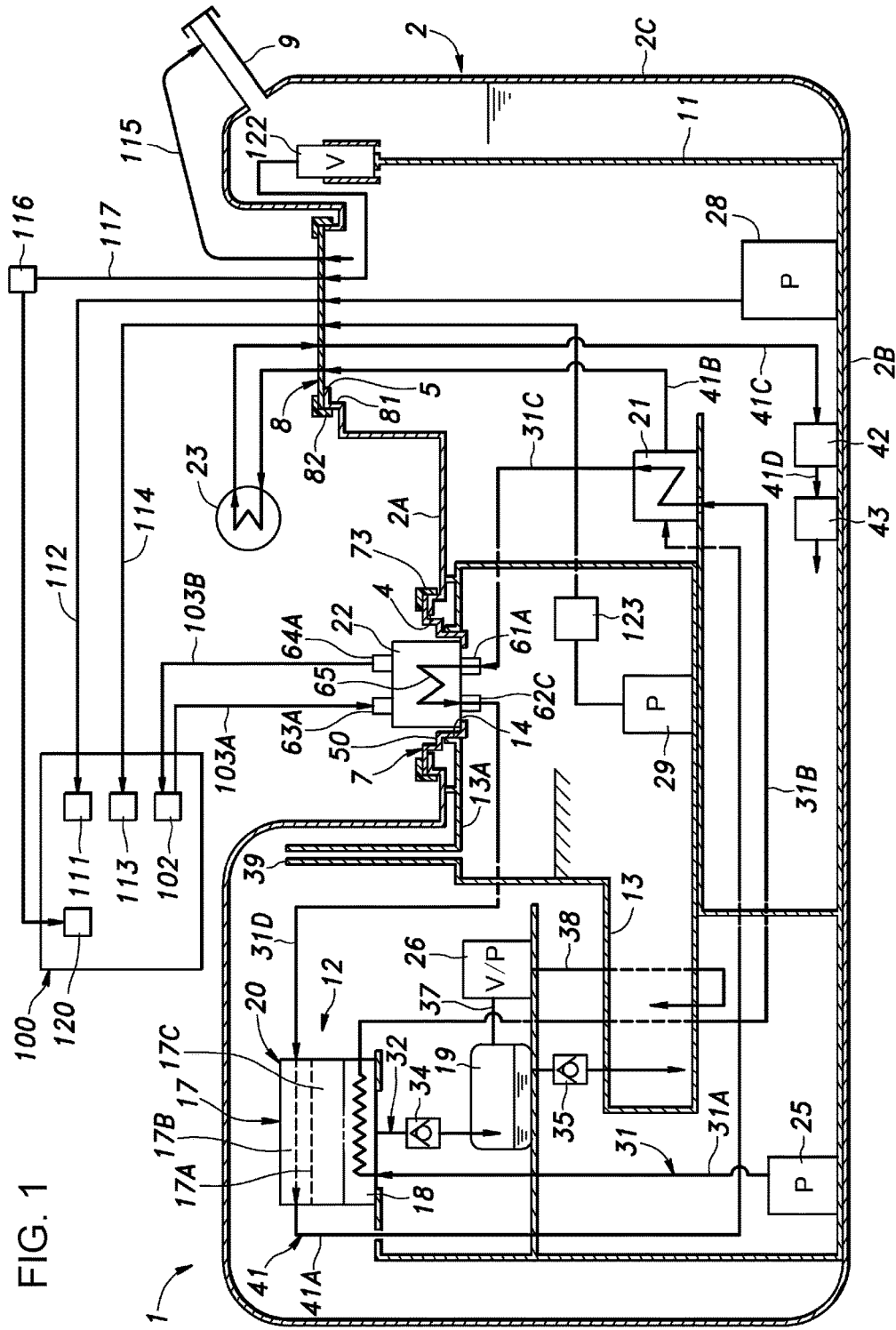
FIG. 1 is a schematic diagram of a fuel storage apparatus according to an embodiment.

The embodiments will now be described with reference to the accompanying drawings, wherein like reference numerals designate corresponding or identical elements throughout the various drawings.

An embodiment of a fuel storage apparatus according to the present application will be described below with reference to the attached drawings. The fuel storage apparatus 1 according to the embodiment is an apparatus that is mounted on a motor vehicle so as to supply fuel to an internal combustion engine 100 mounted on the motor vehicle. The fuel storage apparatus 1 separates a high-octane fuel from a raw fuel supplied to the vehicle and stores the high-octane fuel in such a manner as to be isolated from the raw fuel. The raw fuel, after being subjected to the process of separating the high-octane fuel, has a higher ratio of low-octane fuel. According to conditions under which the motor vehicle travels, the fuel storage apparatus 1 selectively delivers the high-octane fuel and the raw fuel (containing the low-octane fuel) to the internal combustion engine 100. The raw fuel is fuel of different octane numbers and may include a mix of ethanol or other alcohol and gasoline (for example, ethanol-blended gasoline). The high-octane fuel contains a higher ratio of high-octane fuel than the raw fuel, while the low-octane fuel contains a higher ratio of low-octane fuel than the raw fuel. For the raw fuel consisting of ethanol-blended gasoline, the high-octane fuel includes ethanol as the major component, while the low-octane fuel includes gasoline having a lower ratio of ethanol content (concentration).

Figure 2:
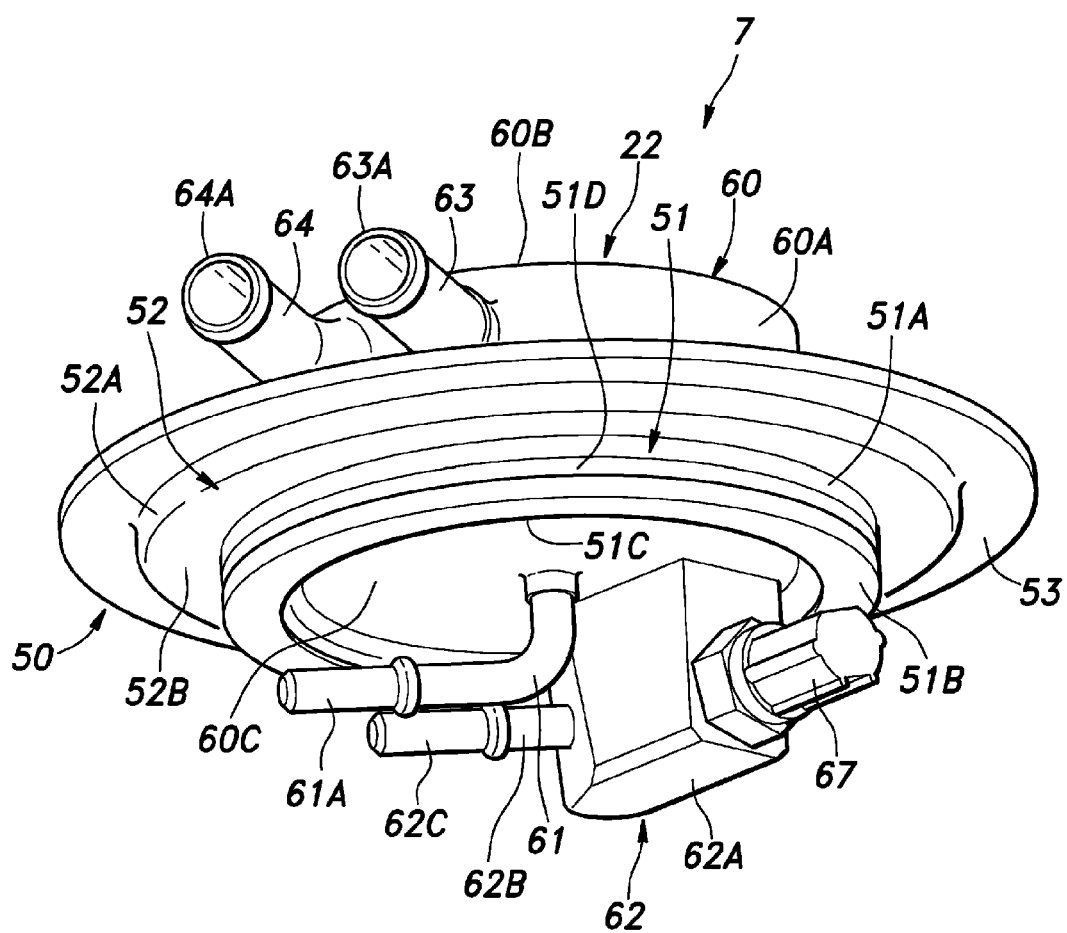
FIG. 2 is a perspective view of a first lid as viewed obliquely from below.
Figure 3:
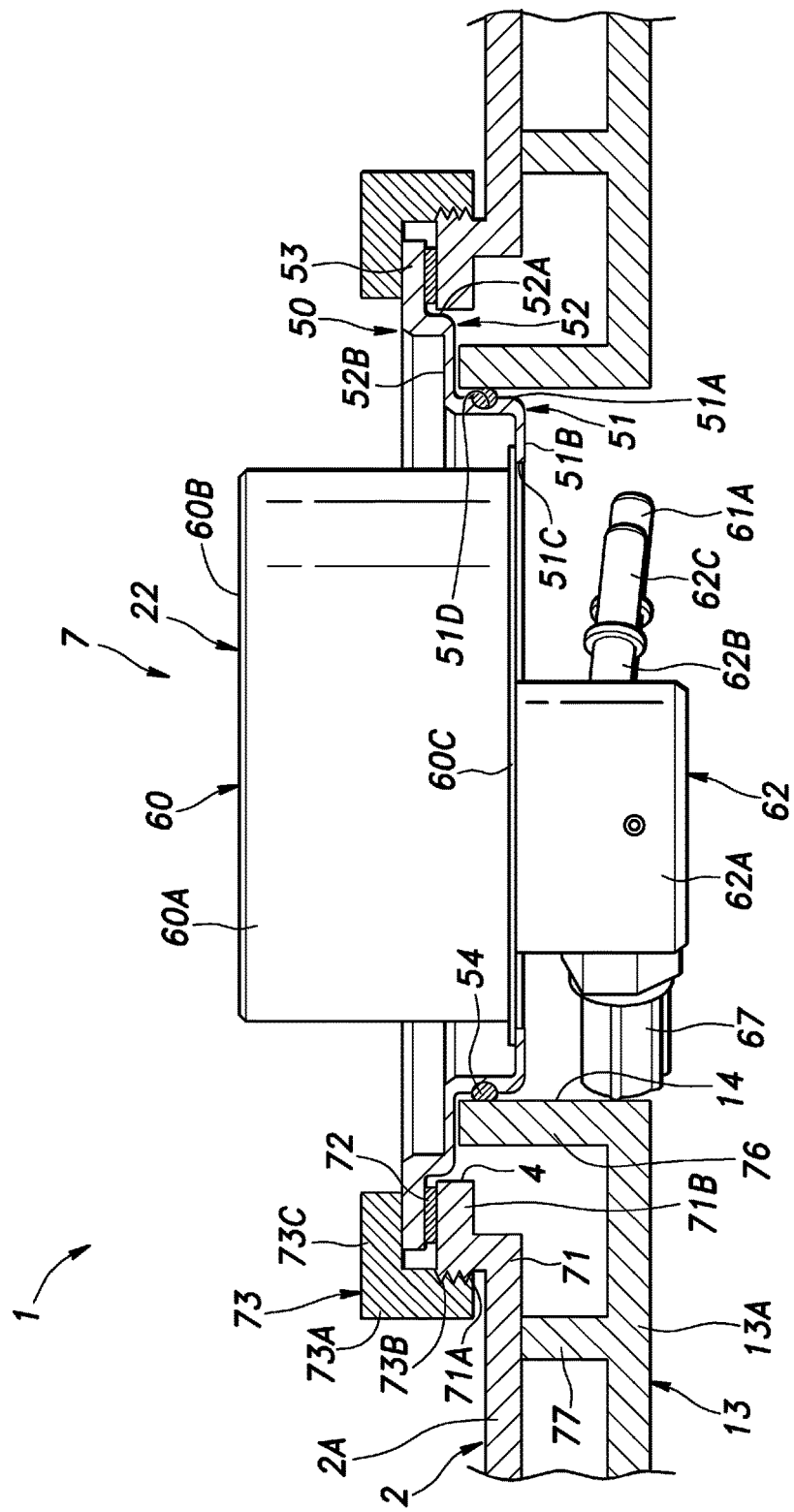
FIG. 3 is an enlarged sectional view of a first lid and its surrounding components of a fuel storage apparatus.

As shown in FIG. 1, the fuel storage apparatus 1 includes a raw fuel tank 2 (a first fuel tank) for storing the raw fuel. In this embodiment, the raw fuel tank 2 is formed of resin. The raw fuel tank 2 may be formed to have any shape. As shown in FIGS. 1 through 3, the raw fuel tank 2 includes a top wall 2A, a bottom wall 2B, both of which oppose each other at a distance, and side walls 2C that are provided so as to extend to circumferential edges of the top wall 2A and the bottom wall 2B, all of which create a space therein.

The top wall 2A has a first opening 4 (first opening) and a second opening 5, both of which pass through the top wall 2A in the thickness direction. The first opening 4 is openable and closable by a first lid 7, while the second opening 5 is openable and closable by a second lid 8. In addition, the top wall 2A has a filler pipe 9 through which the raw fuel is supplied from the outside.

The fuel storage apparatus 1 has in the raw fuel tank 2 a frame 11 as a skeleton member of the raw fuel tank 2, most parts of a separation device 12 that separates the raw fuel into the high-octane fuel and the low-octane fuel, and a high-octane fuel tank 13 (second fuel tank) for storing the high-octane fuel separated by the separation device 12. The high-octane fuel tank 13 has a third opening 14 (second opening) in the top wall 13A. As detailed later, the third opening 14 is disposed so as to oppose the first opening 4 and is closed by the first lid 7 together with the first opening 4.

The separation device 12 includes as major components a separator 17, a condenser 18, a buffer tank 19, first through third heat exchangers 21, 22, 23, a fuel circulation pump 25, and a vacuum pump 26 (negative pressure pump). The separator 17 and the condenser 18 are coupled to each other, thereby constituting a separator unit 20. Of the components of the separation device 12, the separator 17, the condenser 18, the buffer tank 19, the first heat exchanger 21, the fuel circulation pump 25, and the vacuum pump 26 are disposed inside the raw fuel tank 2 outside the high-octane fuel tank 13, while the second heat exchanger 22 is incorporated into the first lid 7 and the third heat exchanger 23 is disposed outside the raw fuel tank 2.

The fuel storage apparatus 1 has a raw fuel pump 28 provided inside the raw fuel tank 2 outside the high-octane fuel tank 13, the raw fuel pump 28 pressure-feeding to the internal combustion engine 100 the low-octane fuel (raw fuel) stored inside the raw fuel tank 2 outside the high-octane fuel tank 13. In addition, the fuel storage apparatus 1 has a high-octane fuel pump 29 that pressure-feeds the high-octane fuel stored inside the high-octane fuel tank 13 to the internal combustion engine 100.

The frame 11 supports the raw fuel tank 2 from the inside, thereby reducing or eliminating possible deformation of the raw fuel tank 2. The frame 11 is formed of, for example, resin. The frame 11 supports the high-octane fuel tank 13, the separation unit 20, the buffer tank 19, the first heat exchanger 21, the fuel circulation pump 25, and the vacuum pump 26.

The fuel circulation pump 25 feeds the raw fuel stored in the raw fuel tank 2 to the separator 17 through the process of pressurization of the raw fuel. The fuel circulation pump 25, the condenser 18, the first heat exchanger 21, and the second heat exchanger 22 are provided in this order on the path of a fuel pipe 31 that connects the fuel circulation pump 25 and the separator 17. More specifically, the fuel pipe 31 includes a first section 31A connecting the fuel circulation pump 25 and the condenser 18, a second section 31B connecting the condenser 18 and the first heat exchanger 21, and a third section 31C connecting the first heat exchanger 21 and the second heat exchanger 22, and a fourth section 31D connecting the second heat exchanger 22 and the separator 17. The third section 31C and the fourth section 31D have portions that pass through walls of the high-octane fuel tank 13. The raw fuel pressure-fed from the fuel circulation pump 25 is subjected to heat exchange by the condenser 18, the first heat exchanger 21, and the second heat exchanger 22 and, as a result, is supplied to the separator 17 at an elevated temperature compared with the raw fuel stored at the bottom of the raw fuel tank 2. The condenser 18, the first heat exchanger 21, and the second heat exchanger 22 are detailed later in this description.

The separator 17 separates the raw fuel into the high-octane fuel and the low-octane fuel in accordance with the principle of pervaporation. The separator 17 has a separation membrane 17A that selectively allows the high-octane fuel of the raw fuel to pass therethrough, a first chamber 17B, and a second chamber 17C both of which are separated by the separation membrane 17A. The separation membrane 17A includes, for example, a nonporous polymer membrane or an inorganic membrane that is microporous at the molecular level and is appropriately selected depending on the component to be separated from the raw fuel. For example, if the raw fuel is ethanol-blended gasoline, the separation membrane 17A may include a membrane that selectively allows ethanol and aromatic components to pass therethrough.

Pumped by the fuel circulation pump 25, the raw fuel passes through the condenser 18, the first heat exchanger 21, and the second heat exchanger 22. During the passage of the above units, the temperature and pressure of the raw fuel are raised and the raw fuel is delivered to the first chamber 17B of the separator 17. The second chamber 17C is depressurized by the vacuum pump 26 to be described later. This causes the high-octane fuel of the raw fuel delivered to the first chamber 17B to turn into a gas that passes through the separation membrane 17A and becomes trapped in the second chamber 17C. As a result, the fuel trapped in the second chamber 17C becomes the high-octane fuel that includes more of the high-octane component than the raw fuel. In contrast, as progressing toward an outlet side of the first chamber 17B, the raw fuel delivered to the first chamber 17B is deprived of the high-octane component, becoming low-octane fuel that includes more low-octane fuel than the raw fuel. If the raw fuel is ethanol-blended gasoline, the high-octane fuel trapped in the second chamber 17C includes ethanol as a major component, while the low-octane fuel passing through the first chamber 17B includes gasoline having a lower ratio of ethanol content (concentration).

It is preferable that the condenser 18 be disposed adjacent to the second chamber 17C of the separator 17. The condenser 18 is coupled to the lower part of the separator 17 in such a manner that the separator 17 and the condenser 18 constitute the single separator unit 20.

The condenser 18 performs heat exchange between the gaseous high-octane fuel delivered from the second chamber 17C and the raw fuel delivered from the fuel circulation pump 25. Through the process of this heat exchange, the gaseous high-octane fuel is cooled and condensed into a liquid state, while the raw fuel is heated.

The condenser 18 is connected to the high-octane fuel tank 13 via the fuel line 32. A buffer tank 19 is provided on the path of the fuel line 32. The condenser 18 is disposed above the buffer tank 19 and the high-octane fuel tank 13, while the buffer tank 19 is disposed above the high-octane fuel tank 13. More specifically, the condenser 18, the buffer tank 19, and the high-octane fuel tank 13 are configured in terms of positional relationship so as to ensure that a fluid level in the condenser 18 is positioned above a fluid level in the buffer tank 19 and a fluid level in the high-octane fuel tank 13 and that the fluid level in the buffer tank 19 is positioned above the fluid level in the high-octane fuel tank 13. In addition, it is preferable that the separator 17 be disposed above the buffer tank 19 and the high-octane fuel tank 13. Such a configured positional relationship of the condenser 18, the buffer tank 19, and the high-octane fuel tank 13 enables the high-octane fuel in a liquid state to flow from the condenser 18 into the buffer tank 19 due to gravity. Then, the high-octane fuel flows into the high-octane fuel tank 13.

A first one-way valve 34 that allows only the flow of a fluid from the condenser 18 to the buffer tank 19 is provided on the fuel line 32 at a connection between the condenser 18 and the buffer tank 19. In addition, a second one-way valve 35 that allows only the one-way flow of a fluid from the buffer tank 19 to the high-octane fuel tank 13 is provided on the fuel line 32 at a connection between the buffer tank 19 and the high-octane fuel tank 13.

An inlet port of the vacuum pump 26 is connected to a gas-phase section, namely an upper section, of the buffer tank 19 via a pipe 37. In addition, an outlet port of the vacuum pump 26 is connected to a liquid-phase section (namely, a lower section) of the high-octane fuel tank 13 via a pipe 38. When the vacuum pump 26 is activated, the gas in the upper section of the buffer tank 19 is delivered to the high-octane fuel tank 13 through the pipes 37, 38, causing the buffer tank 19 to be depressurized. The depressurized buffer tank 19 facilitates the flow of the fluid from the condenser 18 to the buffer tank 19. As a result, the first one-way valve 34 is opened, resulting in depressurization of the condenser 18 and the second chamber 17C of the separator 17, both of which are in communication with the buffer tank 19. At this time, since the buffer tank 19 is depressurized, the second one-way valve 35 is closed and, as a result, the high-octane fuel tank 13 is not depressurized. When the vacuum pump 26 is deactivated, the pressure inside the buffer tank 19 and the condenser 18 becomes equal to the pressure inside the raw fuel tank 2, allowing the high-octane fuel in the buffer tank 19 to flow into the high-octane fuel tank 13 through the second one-way valve 35 due to gravity.

The high-octane fuel tank 13 has an upward extending communication pipe 39 provided in the top wall 13A thereof, the communication pipe 39 providing communication between the gas-phase section of the upper section of the high-octane fuel tank 13 and the gas-phase section of the upper section of the raw fuel tank 2. An upper end of the communication pipe 39 is disposed close to an inner surface of the top wall 2A of the raw fuel tank 2.

An outlet port of the first chamber 17B of the separator 17 is in communication with a lower section of an internal space of the raw fuel tank 2 via the fuel line 41. The separator 17, the first heat exchanger 21, the third heat exchanger 23, a strainer 42, and a pressure-regulating valve 43 are provided in this order on the path of the fuel line 41. More specifically, the fuel line 41 includes a fifth section 41A connecting the outlet port of the first chamber 17B of the separator 17 and the first heat exchanger 21, a sixth section 41B connecting the first heat exchanger 21 and the third heat exchanger 23, a seventh section 41C connecting the third heat exchanger 23 and the strainer 42, and an eighth section 41D connecting the strainer 42 and the pressure-regulating valve 43.

The first heat exchanger 21 performs heat exchange between the relatively low-temperature raw fuel delivered to the separator 17 from the fuel circulation pump 25 and the relatively high-temperature low-octane fuel passing through the separator 17. The heat exchanger 21 may include a publicly known countercurrent exchanger. Through the process of heat exchange occurring in the first heat exchanger 21, the raw fuel delivered to the separator 17 from the fuel circulation pump 25 is heated, while the low-octane fuel passing through the separator 17 is cooled.

The third heat exchanger 23 is provided outside the raw fuel tank 2. The fuel line 41 extends from the first heat exchanger 21 to the third heat exchanger 23 through the second lid 8. In addition, the fuel line 41 extends from the third heat exchanger 23 to the inside of the raw fuel tank 2 again through the second lid 8. In this embodiment, the third heat exchanger 23 includes an air-cooled cooler (or a radiator) that performs heat exchange between fuel and air. The relatively high-temperature low-octane fuel passing through the separator 17 is cooled by the third heat exchanger 23. In another embodiment, the third heat exchanger 23 may be provided inside the raw fuel tank 2. For example, the third heat exchanger 23 may be provided on the bottom wall 2B of the raw fuel tank 2 so as to allow heat exchange between the relatively high-temperature low-octane fuel passing through the separator 17 and the bottom wall 2B. The bottom wall 2B of the raw fuel tank 2 is cooled by air cooling that occurs when the vehicle provided with the fuel storage apparatus 1 is travelling or by forced air generated by a fan or the like.

The low-octane fuel passing through the third heat exchanger 23 enters the strainer 42 where foreign matter is removed. Then, after passing through the pressure-regulating valve 43, the low-octane fuel is discharged to the bottom of the raw fuel tank 2 and mixed into the raw fuel. The low-octane fuel mixed into the raw fuel degrades the octane number of the fuel of the raw fuel tank 2 as a whole. As the process of the separation progresses (namely, as the total amount of raw fuel passing through the separator 17 increases), the fuel of the raw fuel tank 2 continues to degrade in octane number, more closely resembling the low-octane fuel in component composition. The pressure-regulating valve 43 regulates pressure of the raw fuel and the low-octane fuel contained in the path from the fuel circulation pump 25 to the pressure-regulating valve 43, thereby maintaining pressure of the raw fuel of the first chamber 17B of the separator 17 at a predetermined level. More specifically, when the pressure of the raw fuel (or the low-octane fuel) is raised by the fuel circulation pump 25 to such a degree that a predetermined level is exceeded, the pressure-regulating valve 43 discharges the raw fuel (or the low-octane fuel) to the raw fuel tank 2, thereby maintaining the pressure at a predetermined level.

The second heat exchanger 22 is used as a heater for heating the raw fuel, performing heat exchange between the raw fuel that is pressure-fed to the separator 17 from the fuel circulation pump 25 and a high-temperature heating medium delivered from outside the raw fuel tank 2. The second heat exchanger 22 includes, for example, a publicly known heat exchanger. The high-temperature heating medium delivered to the second heat exchanger 22 includes, for example, engine coolant whose temperature is raised through the process of passing through the internal combustion engine 100, a lubricating oil whose temperature is raised through the process of passing through the internal combustion engine 100, an automatic transmission fluid whose temperature is raised through the process of passing through a transmission, a fluid whose temperature is raised through the process of heat exchange with exhaust gas emitted from the internal combustion engine 100, and exhaust gas. The high-temperature heating medium used in this embodiment includes engine coolant heated by the internal combustion engine 100 and is delivered to the second heat exchanger 22 through medium pipes 103A, 103B that are in communication with a coolant passage 102 of the internal combustion engine 100.

The second heat exchanger 22, together with a lid member 50, constitutes the first lid 7. In other words, the second heat exchanger 22 constitutes at least part of the first lid 7.

As shown in FIGS. 2 and 3, the second heat exchanger 22 includes a cylindrically-shaped main body 60 that constitutes an internal space thereof, a fuel inlet pipe 61 projecting from the main body 60, a fuel outlet passage member 62, a medium inlet pipe 63, a medium outlet pipe 64, a fuel passage 65 that is disposed in the internal space of the main body 60 and that is connected to the fuel inlet pipe 61 and the fuel outlet passage member 62, and a temperature sensor 67.

The main body 60 includes a cylindrically-shaped circumferential wall 60A, an outer end wall 60B that closes one end of the circumferential wall 60A, and an inner end wall 60C that closes the other end of the circumferential wall 60A. The inner end wall 60C is larger in diameter than the circumferential wall 60A. The fuel passage 65 includes a plurality of plate-like branch passages that are spaced in parallel apart from one another, an inlet port that connects ends of the branch passages to one another, and an outlet port that connects the other ends of the branch passages to one another. Each of the branch passages is formed by joining, for example, circumferential edges of two metal plates opposing each other, while inlet and outlet ports are formed of, for example, pipes. The inlet and outlet of the fuel passage 65 pass through the inner end wall 60C and are opened to the outside of the inner end wall 60C.

An end of the fuel inlet pipe 61 is joined to an external surface of the inner end wall 60C so as to be connected to the inlet port of the fuel passage 65. In addition, the fuel outlet passage member 62 is joined to the external surface of the inner end wall 60C so as to be connected to the outlet port of the fuel passage 65. The fuel outlet passage member 62 includes a base 62A joined to the inner end wall 60C and an end portion 62B of a pipe member joined to the base 62A. The base 62A and the end portion 62B have a passage formed thereinside through which the fuel flows. The temperature sensor 67 is joined to the base 62A and has its sensing element provided in the passage of the base 62A. The temperature sensor 67 detects the temperature of the fuel flowing in the base 62A.

The fuel inlet pipe 61 has a joint 61A (first joint of a fuel joint structure) provided at an end thereof, while the fuel outlet passage member 62 has a joint 62C (first joint of the fuel joint structure) provided at an end 62B thereof. The joint 61A is formed so as to be connected to an end of the third section 31C of the fuel pipe 31, while the joint 62O is formed so as to be connected to an end of the fourth section 31D of the fuel pipe 31. The joint 61A provides connection between the third section 31C of the fuel pipe 31 and the fuel inlet pipe 61, while the joint 62C provides connection between the fuel outlet passage member 62 and the fourth section 31D of the fuel pipe 31. With this arrangement, the fuel flowing through the third section 31C of the fuel pipe 31 passes through the fuel inlet pipe 61, the fuel passage 65, and the fuel outlet passage member 62, in this order, into the fourth section 31D.

Ends (base ends) of the medium inlet pipe 63 and the medium outlet pipe 64 are joined to the circumferential wall 60A so as to be connected to the internal space of the main body 60. The medium inlet pipe 63 and the medium outlet pipe 64 have joints 63A, 64A (second joints of a medium joint structure) provided at another ends (or tips) thereof. The joint 63A is formed so as to be connected to an end of the medium pipe 103A, while the joint 64A is formed so as to be connected to an end of the medium pipe 103B. The joint 63A provides connection between the medium pipe 103A and the medium inlet pipe 63, while the joint 64A provides connection between the medium outlet pipe 64 and the medium pipe 103B. With this arrangement, the coolant (namely, heat exchange medium) that flows through the coolant passage 102 and that is heated through the process of heat exchange with the internal combustion engine 100 passes through the medium pipe 103A, the medium inlet pipe 63, the internal space of the main body 60, the medium outlet pipe 64, and the medium pipe 103B, in this order, and is finally returned to the coolant passage 102. The coolant flowing through the internal space of the main body 60 performs heat exchange with the fuel flowing through the fuel passage 65. As a result, the fuel flowing through the fuel passage 65 is heated, while the coolant flowing through the internal space of the main body 60 is cooled.

The lid member 50 includes a first cylindrical portion 51 (central cylindrical portion), a second cylindrical portion 52, both of which are provided at the center thereof, and a flange 53 provided at an outer circumferential portion thereof. The first cylindrical portion 51 includes a cylindrically-shaped first circumferential wall 51A and a first bottom wall 51B provided at an axial end of the first circumferential wall 51A with the other end being opened. The first bottom wall 51B has a circular through-hole 51C passing therethrough in the thickness direction at the center thereof. The second cylindrical portion 52 includes a cylindrically-shaped second circumferential wall 52A that is larger in diameter than the first circumferential wall 51A and a second bottom wall 52B provided at an axial end of the second circumferential wall 52A with the other end being opened. The second bottom wall 52B has a circular through-hole passing therethrough in the thickness direction at the center thereof, the through-hole being joined to the other end of the first circumferential wall 51A. The flange 53 is formed in an annular shape, projecting radially outward from the other end of the second circumferential wall 52A. In other words, the lid member 50 has the second cylindrical portion 52 projecting from the flange 53 to one side and the first cylindrical portion 51 further projecting to one side from the second bottom wall 52B of the second cylindrical portion 52.

The inner end wall 60C of the main body 60 of the second heat exchanger 22 is joined to a surface of the first bottom wall 51B on the side of the first circumferential wall 51A and closes the through-hole 51C. The fuel inlet pipe 61 and the fuel outlet passage member 62 pass through the through-hole 51C and projects to the side across the first circumferential wall 51A from the first bottom wall 51B.

As shown in FIG. 3, a first boss 71 projecting upward from the top wall 2A is formed around the first opening 4. The first boss 71 has a male thread 71A formed in an outer circumferential surface thereof. An annularly shaped inward-facing flange 71B projecting radially inward is formed at a projecting end of the first boss 71. The inward-facing flange 71B expands a projecting end surface of the first boss 71. The first opening 4 is formed as an inner hole provided on the inner side of the inward-facing flange 71B. The upper end surface of the inward-facing flange 71B is a plane that is perpendicular to the axis line of the first opening 4 (first boss 71). An annularly shaped first sealing member 72 extending so as to surround the first opening 4 is disposed on the upper end surface of the inward-facing flange 71B. The first sealing member 72 is flexible and can adhere to a surface to be sealed.

The third opening 14 is disposed inside the raw fuel tank 2 so as to be substantially coaxial with the first opening 4. A cylindrically-shaped third boss 76 upward projecting from the top wall 13A of the high-octane fuel tank 13 is formed around the third opening 14. The third opening 14 is formed as an inner hole of the third boss 76. The third opening 14 is configured to be smaller in diameter than the first opening 4. A projection 77 projecting upward and being in contact with the back side of the top wall 2A of the raw fuel tank 2 is formed on the upper surface of the top wall 13A. The projecting end (upper end) of the third boss 76 is disposed in the raw fuel tank 2 so as to be located downward away from the inward-facing flange 71B of the first boss 71.

The flange 53 of the lid member 50 is in contact with the inward-facing flange 71B of the first boss 71 with the first sealing member 72 therebetween. With this arrangement, the first opening 4 is closed by the first lid 7. When the flange 53 comes into contact with the inward-facing flange 71B of the first boss 71 with the first sealing member 72 therebetween, the second cylindrical portion 52 loosely fits into the first opening 4 and the first cylindrical portion 51 fits into the third opening 14 (inner hole of the third boss 76). An annularly shaped sealing groove 51D extending circumferentially is provided in the circumferential surface of the first circumferential wall 51A. The sealing groove 51D has an annularly shaped second sealing member 54 mounted therein. The second sealing member 54 is flexible. The second sealing member 54 provides a seal between the inner circumferential surface of the third boss 76 and the outer circumferential surface of the first circumferential wall 51A. With this arrangement, the third opening 14 is closed by the first lid 7. As described above, the first lid 7 closes both the first opening 4 and the third opening 14.

The flange 53 is fastened to the first boss 71 by means of a first cap 73 screwed up to the male thread 71A of the first boss 71. The first cap 73 includes a cylindrical portion 73A that can accept the first boss 71, a female thread 73B that is formed in an inner surface of the cylindrical portion 73A and into which the male thread 71 of the first boss 71 is screwed, and a flange 73C projecting radially inward from one end of the cylindrical portion 73A. With the first cap 73 screwed up to the first boss 71, the flange 53 is pressed against the first boss 71 by the flange 73C of the first cap 73, thereby adhering closely to the inward-facing flange 71B of the first boss 71 with the first sealing member 72 therebetween.

With the first opening 4 and the third opening 14 being closed by the first lid 7, the joints 61A, 62C connected to the fuel pipe 31 are disposed inside the high-octane fuel tank 13, while the joints 63A, 64A connected to the medium pipes 103A, 103B are disposed outside the raw fuel tank 2.

As shown in FIG. 1, a cylindrically-shaped second boss 81 projecting upward from the top wall 2A is formed around the second opening 5. The second opening 5 is formed as an inner hole of the second boss 81. The second boss 81 has a male thread (not illustrated) formed in an outer circumferential surface thereof. The second lid 8 is formed in the shape of a disk and can come into contact with a projecting end surface of the second boss 81 with a sealing member (not illustrated) therebetween. The second lid 8 is fastened to the second boss 81 by means of a second cap 82 screwed up to the second boss 81. The second cap 82 includes a cylindrical portion that can accept the second boss 81, a female thread that is formed in an inner surface of the cylindrical portion and into which the male thread of the second boss 81 is screwed, and a flange projecting radially inward from one end of the cylindrical portion. With the second cap 82 screwed up to the second boss 81, the second lid 8 is pressed against the second boss 81 by the flange of the second cap 82, thereby adhering closely to a projecting end surface of the second boss 81 with the sealing member therebetween and closing the second opening 5.

A first fuel line 112 connecting a raw fuel pump 28 and a first injector 111 of the internal combustion engine 100, a second fuel line 114 connecting a high-octane fuel pump 29 and a second injector 113 of the internal combustion engine 100, a breather pipe 115 connecting the gas-phase section of the upper section of the raw fuel tank 2 and an upstream end of the filler pipe 9, a vapor pipe 117 connecting the gas-phase section of the upper section of the raw fuel tank 2 and a canister 116, and the sixth section 41B and the seventh section 41C of the fuel line 41 pass through the second lid 8. In addition, a bundle of cables including signal lines and power cables for the fuel circulation pump 25, the vacuum pump 26, the raw fuel pump 28, and the high-octane fuel pump 29 pass through the second lid 8, though not illustrated. A portion of the second lid 8 through which the first fuel line 112, the second fuel line 114, the breather pipe 115, the vapor pipe 117, and the sixth section 41B and the seventh section 41C of the fuel line 41 pass is sealed so as to be airtight.

When the vehicle is filled up with fuel through the filler pipe 9, the breather pipe 115 enables gaseous matter inside the raw fuel tank 2 to be released to the filler pipe 9 therethrough, thereby facilitating a flow of raw fuel into the raw fuel tank 2. In addition, the vapor pipe 117 enables fuel vapor inside the raw fuel tank 2 to be released to the canister 116 therethrough, thereby maintaining the pressure inside the raw fuel tank 2 at the atmospheric pressure. The fuel vapor sent to the canister 116 are adsorbed onto activated carbon contained in the canister 116. Negative pressure generated in an air intake passage 120 during operation of the internal combustion engine 100 is used to suck the fuel adsorbed onto the activated carbon of the canister 116 into combustion chambers of the engine where the fuel is combusted. The vapor pipe 117 has a float valve 122 provided at an end thereof that is located inside the raw fuel tank 2. The float valve 122 is opened or closed according to the level of the raw fuel inside the raw fuel tank 2, thereby preventing liquid fuel from flowing into the vapor pipe 117.

A strainer 123 for removing impurities from the fuel is provided in the second fuel line 114 at a point located inside the high-octane fuel tank 13.

Operation and effects of the fuel storage apparatus 1 will be described below. Pressurized by the fuel circulation pump 25, the raw fuel of the raw fuel tank 2 passes through the condenser 18, the first heat exchanger 21, and the second heat exchanger 22, in this order, into the first chamber 17B of the separator 17. At this time, the temperature of the raw fuel is raised through the processes of heat exchange occurring in the condenser 18 with the gas of the high-temperature high-octane fuel, heat exchange in the first heat exchanger 21 with the high-temperature low-octane fuel passing through the separator 17, and heat exchange in the second heat exchanger 22 with heated engine coolant.

When the vacuum pump 26 is activated, the second chamber 17C of the separator 17 is depressurized. In the separator 17, when the second chamber 17C is depressurized by means of suction by the vacuum pump 26, the high-octane fuel component of the high-temperature/high-pressure raw fuel delivered to the first chamber 17B turns into a gas that passes through the separation membrane 17A and becomes trapped in the second chamber 17C. The gaseous high-octane fuel trapped in the second chamber 17C flows into the condenser 18 where the gaseous fuel is cooled and condensed through the process of heat exchange with the raw fuel delivered to the separator 17 by the fuel circulation pump 25. The high-octane fuel condensed in the condenser 18 flows into the buffer tank 19 for storage due to gravity.

When the vacuum pump 26 is deactivated, the pressure inside the buffer tank 19 becomes equal to the pressure inside the raw fuel tank 2. Due to gravity, the high-octane fuel in the buffer tank 19 opens the second one-way valve 35 through which the high-octane fuel flows into the high-octane fuel tank 13 where the high-octane fuel is stored.

The low-octane fuel passing through the first chamber 17B of the separator 17 is cooled through the process of heat exchange in the first heat exchanger 21 with the raw fuel delivered to the separator 17 by the fuel circulation pump 25 and is further cooled in the heat exchanger 23. After that, the low-octane fuel passes through the strainer 42 and the pressure-regulating valve 43 into the raw fuel tank 2 where the low-octane fuel is mixed into the raw fuel.

In the fuel storage apparatus 1, as the total amount of raw fuel passing through the separator 17 increases, the amount of high-octane fuel to be stored in the high-octane fuel tank 13 increases and, in addition, the ratio of the low-octane fuel contained in the raw fuel increases. The amount of raw fuel passing through the separator 17 can be regulated by controlling the fuel circulation pump 25 and the vacuum pump 26. The fuel circulation pump 25 and the vacuum pump 26 may be controlled by a fuel level of the high-octane fuel tank 13, the concentration of the high-octane fuel contained in the raw fuel, the operation hours of the fuel circulation pump 25 or the like.

The fuel storage apparatus 1 according to this embodiment has the separation device 12 and the high-octane fuel tank 13 disposed inside the raw fuel tank 2. The raw fuel tank 2 configured to be airtight eliminates the need for making airtight the separation device 12, the high-octane fuel tank 13, and joints for connecting these components, which provides an advantage of a smaller number of airtight members or components required.

The third section 31C and the fourth section 31D of the fuel pipe 31 and the joints 61A, 62C connected to these sections are disposed inside the high-octane fuel tank 13. For this reason, even if fuel leaks from connections between the joints 61A, 62C and the third section 31C and the fourth section 31D, the fuel remains in the high-octane fuel tank 13 without escaping from the raw fuel tank 2 to the outside. In addition, the joints 63A, 64A connected to the medium pipes 103A, 103B through which engine coolant flows are disposed outside the raw fuel tank 2. For this reason, even if engine coolant leaks from connections between the joints 63A, 64A and the medium pipes 103A, 103B, engine coolant does not enter the raw fuel tank 2 nor is mixed into the fuel.

The second heat exchanger 22 is incorporated into the first lid 7 providing a partition that is between the inside and outside of the raw fuel tank 2 and between the inside and outside of the high-octane fuel tank 13, which enables the joints 61A, 62C to be easily disposed inside the high-octane fuel tank 13 (or raw fuel tank 2) and also enables the joints 63A, 64A to be easily disposed outside the raw fuel tank 2.

Both the first opening 4 and the third opening 14 are opened/closed by the first lid 7, which allows the high-octane fuel tank 13 to be easily opened/closed. In this embodiment, the direction in which the first sealing member 72 between the first lid 7 and the first boss 71 is compressed is different from the direction in which the second sealing member 54 between the first lid 7 and the third boss 76 is compressed. For this reason, even if there is an error in the relative position between the first opening 4 and the third opening 14, the first sealing member 72 provides a reliable and durable seal between the first lid 7 and the first boss 71, while the second sealing member 54 also provides a reliable and durable seal between the first lid 7 and the third boss 76.

The present application is typically described with reference to, but not limited to, the foregoing embodiment. Various modifications are conceivable within the scope of the present application. For example, although the second heat exchanger 22 is incorporated into the first lid 7 that closes both the first opening 4 and the third opening 14, the second heat exchanger 22 may be incorporated into a lid that closes only an opening formed in the raw fuel tank 2, like the second lid 8 that closes the second opening 5.

A first aspect of the present application provides a fuel storage apparatus (1) that includes a fuel tank (2), a heat exchanger (22) that performs heat exchange between fuel inside the fuel tank and a heat exchange medium, a fuel pipe (31C, 31D) that is provided inside the fuel tank and that delivers the fuel to the heat exchanger, a medium pipe (103A, 103B) that is provided outside the fuel tank and that delivers the heat exchange medium to the heat exchanger, in which the heat exchanger has a first joint (61A, 62C) provided inside the fuel tank and connectable to the fuel pipe and a second joint (63A, 64A) provided outside the fuel tank and connectable to the medium pipe.

With this arrangement, even if fuel leaks from connections between the first joint and the fuel pipe, the fuel remains in the fuel tank without escaping to the outside of the fuel tank. Likewise, even if heat exchange medium leaks from connections between the second joint and the medium pipe, the heat exchange medium does not enter the fuel tank nor is mixed into the fuel.

A second aspect of the present application provides the fuel storage apparatus in which the fuel tank may have an opening (4) and the heat exchanger may constitute at least part of a lid (7) that closes the opening.

The heat exchanger is incorporated into the lid providing a partition between the inside and outside of the fuel tank, which enables the first joints to be easily disposed inside the fuel tank and also enables the second joints to be easily disposed outside the fuel tank.

A third aspect of the present application provides the fuel storage apparatus in which the fuel tank may have a first fuel tank (2) having a first opening (4) and a second fuel tank (13) provided inside the first fuel tank and in which the heat exchanger may constitute at least part of the lid that closes the first opening.

The heat exchanger is provided in the first fuel tank disposed outside the second fuel tank, which enables easy installation of the heat exchanger.

A fourth aspect of the present application provides the fuel storage apparatus in which the second fuel tank may have a second opening (14) that opposes the first opening and in which the heat exchanger may constitute at least part of the lid that closes both the first opening and the second opening.

The lid including the heat exchanger closes both the first opening and the second opening, which results in a reduction in the number of parts and components required.

A fifth aspect of the present application provides the fuel storage apparatus in which the second opening may be defined by an inner circumferential surface of a cylindrical portion formed in the second fuel tank and in which the lid may have a middle cylindrical portion (51) that fits the second opening and an outer circumferential portion (53) that is in contact with a circumferential edge of the first opening on an outer surface of the first fuel tank.

With this arrangement, even if there is a dimensional error in the relative position between the first opening and the second opening, the lid can reliably close the first opening and the second opening, making the dimensional error allowable.

A sixth aspect of the present application provides the fuel storage apparatus in which an annularly shaped first sealing member (72) surrounding the first opening may be provided between the outer circumferential portion and the outer surface of the first fuel tank and in which an annularly shaped second sealing member (54) may be provided between an outer surface of the middle cylindrical portion and the inner circumferential surface.

With this arrangement, the direction in which the first sealing member is compressed is different from the direction in which the second sealing member is compressed. For this reason, even if there is an error in the relative position between the first opening and the second opening, the first sealing member and the second sealing member can reliably seal a gap between the lid and the circumferential edge of the first opening and a gap between the lid and the circumferential edge of the second opening.

A seventh aspect of the present application provides the fuel storage apparatus in which the first joints may be provided at a portion (60C) facing an inner side of the second fuel tank.

With this arrangement, if fuel leaks from connections between the first joint and the fuel pipe, leaked fuel is trapped in the second fuel tank.

An eighth aspect of the present application provides the fuel storage apparatus in which the first fuel tank may have a separation device (17) provided thereinside, the separation device separating second fuel from first fuel stored in the first fuel tank and in which the second fuel may be stored in the second fuel tank.

With this arrangement, the separation device is disposed inside the first fuel tank. For this reason, even if fuel leaks from the separation device, from the pipe through which the fuel is delivered to the separation device, or from the pipe through which the fuel is delivered from the separation device to the second fuel tank, the fuel remains in the first fuel tank.

A ninth aspect of the present application provides the fuel storage apparatus in which a temperature sensor (67) that detects the temperature of the fuel flowing through the first joints is provided at a portion of the heat exchanger facing an inner side of the fuel tank.

The temperature sensor is provided in the heat exchanger constituting part of the lid that is detachable from the fuel tank, which allows easy maintenance of the temperature sensor.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel storage apparatus comprising:
a fuel tank;
a heat exchanger that performs heat exchange between fuel inside the fuel tank and a heat exchange medium;
a fuel pipe that is provided inside the fuel tank and that delivers the fuel to the heat exchanger; and
a medium pipe that is provided outside the fuel tank and that delivers the heat exchange medium to the heat exchanger,
the heat exchanger comprising:
a first joint provided inside the fuel tank and connectable to the fuel pipe; and
a second joint provided outside the fuel tank and connectable to the medium pipe.

2. The fuel storage apparatus according to claim 1,
wherein the fuel tank has an opening, and
wherein the heat exchanger constitutes at least part of a lid that closes the opening.

3. The fuel storage apparatus according to claim 2,
wherein the fuel tank has a first fuel tank having a first opening and a second fuel tank provided inside the first fuel tank, and
wherein the heat exchanger constitutes at least part of the lid that closes the first opening.

4. The fuel storage apparatus according to claim 3,
wherein the second fuel tank has a second opening that opposes the first opening, and
wherein the heat exchanger constitutes at least part of the lid that closes both the first opening and the second opening.

5. The fuel storage apparatus according to claim 4,
wherein the second opening is defined by an inner wall surface of a cylindrical portion formed in the second fuel tank, and
wherein the lid has a middle cylindrical portion that fits the second opening and an outer circumferential portion that is in contact with a circumferential edge of the first opening on an outer surface of the first fuel tank.

6. The fuel storage apparatus according to claim 5,
wherein an annularly shaped first sealing member surrounding the first opening is provided between the outer circumferential portion and the outer surface of the first fuel tank, and
wherein an annularly shaped second sealing member is provided between an outer surface of the middle cylindrical portion and the inner wall surface.

7. The fuel storage apparatus according to claim 4,
wherein the first joint is provided at a portion facing an inner side of the second fuel tank.

8. The fuel storage apparatus according to claim 4,
wherein the first fuel tank has a separation device provided thereinside, the separation device separating second fuel from first fuel stored in the first fuel tank, and
wherein the second fuel is stored in the second fuel tank.

9. The fuel storage apparatus according to claim 8,
wherein the heat exchanger heats the first fuel that is delivered from the first fuel tank to the separation device.

10. The fuel storage apparatus according to claim 2,
wherein a temperature sensor that detects the temperature of the fuel flowing through the first joint is provided at a portion of the heat exchanger facing an inner side of the fuel tank.

11. A fuel storage apparatus comprising:
a fuel tank;
a heat exchanger mounted to the fuel tank to perform heat exchange between fuel provided inside the fuel tank and a heat exchange medium;
a fuel pipe provided inside the fuel tank and connected to the heat exchanger to supply the fuel to the heat exchanger via the fuel pipe; and
a medium pipe provided outside the fuel tank and connected to the heat exchanger to supply the heat exchange medium to the heat exchanger via the medium pipe.

12. The fuel storage apparatus according to claim 11,
wherein the heat exchanger includes a fuel joint structure provided inside the fuel tank and connected to the fuel pipe.

13. The fuel storage apparatus according to claim 11,
wherein the heat exchanger includes a medium joint structure provided outside the fuel tank and connected to the medium pipe.

14. The fuel storage apparatus according to claim 11,
wherein the fuel tank has an opening, and
wherein the heat exchanger is mounted to the fuel tank to close the opening.

15. The fuel storage apparatus according to claim 11,
wherein the fuel tank includes
a first fuel tank having a first opening, and
a second fuel tank provided inside the first fuel tank, and
wherein the heat exchanger is mounted to the fuel tank to close the first opening.

16. The fuel storage apparatus according to claim 15,
wherein the second fuel tank has a second opening, and
wherein the heat exchanger is mounted to the fuel tank to close both the first opening and the second opening.

17. The fuel storage apparatus according to claim 16,
wherein the first fuel tank includes a circumferential edge provided about the first opening,
wherein the second fuel tank includes a cylindrical portion having an inner wall surface defining the second opening, and
wherein the heat exchanger includes
a middle cylindrical portion provided in the second opening, and
an outer circumferential portion extending radially outward from the middle cylindrical portion to face the circumferential edge of the first fuel tank.

18. The fuel storage apparatus according to claim 17,
wherein a first sealing member has an annular shape and is provided about the first opening, the first sealing member being provided between the outer circumferential portion and the circumferential edge of the first fuel tank, and
wherein a second sealing member has an annular shape and is provided between a radially outer surface of the middle cylindrical portion and the inner wall surface.

19. The fuel storage apparatus according to claim 12,
wherein the heat exchanger includes an inner end surface to face an inside of the fuel tank, and
wherein the fuel joint structure is provided on the inner end surface.

20. The fuel storage apparatus according to claim 15, further comprising:
a separation device provided inside the first fuel tank to separate second fuel from first fuel provided in the first fuel tank,
wherein the second fuel is stored in the second fuel tank.

21. The fuel storage apparatus according to claim 20,
wherein the heat exchanger is mounted to the fuel tank to heat the first fuel delivered from the first fuel tank to the separation device.

22. The fuel storage apparatus according to claim 12, further comprising:
a temperature sensor to detect a temperature of the fuel flowing through the fuel joint structure,
wherein the heat exchanger includes an inner end surface to face an inside of the fuel tank, and
wherein the temperature sensor is provided on the inner end surface.

* * * * *